United States Patent [19]
Takahashi et al.

[11] Patent Number: 5,523,074
[45] Date of Patent: Jun. 4, 1996

[54] PROCESS FOR PREPARAING POLYHEDRAL α-ALUMINA PARTICLES

[75] Inventors: Akihiko Takahashi; Hiroshi Tabuchi, both of Ibaraki, Japan

[73] Assignee: Sumitomo Chemical Company, Limited, Osaka, Japan

[21] Appl. No.: 84,173

[22] Filed: Jul. 1, 1993

[30] Foreign Application Priority Data

Jul. 1, 1992 [JP] Japan .................................. 4-174333
Sep. 25, 1992 [JP] Japan .................................. 4-280523

[51] Int. Cl.$^6$ .................................................. C01F 7/02
[52] U.S. Cl. ........................ 423/625; 423/111; 264/332
[58] Field of Search ................................. 423/625, 111; 264/325, 332

[56] References Cited

U.S. PATENT DOCUMENTS

| | | | |
|---|---|---|---|
| 3,023,115 | 2/1962 | Wainer et al. | 423/625 |
| 3,077,380 | 2/1963 | Wainer et al. | 423/625 |
| 3,141,786 | 7/1964 | Bugosh | 264/332 |
| 3,226,456 | 12/1965 | Ryshkewitch et al. | 264/332 |
| 3,341,285 | 9/1967 | Kelsey | 423/625 |
| 3,421,851 | 1/1969 | Shyne et al. | 423/627 |
| 3,668,062 | 6/1972 | Shyne et al. | 423/625 |
| 4,193,768 | 3/1980 | Ohishi et al. | 423/625 |
| 4,487,756 | 12/1984 | Mizrah et al. | 423/625 |
| 4,820,498 | 4/1989 | Newkirk | 423/625 |

FOREIGN PATENT DOCUMENTS

| | | | |
|---|---|---|---|
| 517324 | 10/1955 | Canada | 423/625 |
| 377750 | 7/1935 | Japan . | |
| 39113465 | 7/1939 | Japan . | |
| 82022886 | 5/1982 | Japan . | |
| 60-054916 | 3/1985 | Japan . | |
| 3131517 | 3/1991 | Japan . | |

OTHER PUBLICATIONS

Study Group Report No. 29, Sep. 1995 (Japan Institute of Light Metals, Study Committee), "Formation Behaviors of Inclusions and Examples of Defects in Aluminum", pp. 35–36 (partial translation).

"Phenomena in Molten Aluminium Induced . . . "; Masato Tsujikawa, et al. 1992, pp. 526–530, no month.

*Primary Examiner*—Steven Bos
*Attorney, Agent, or Firm*—Birch, Stewart, Kolasch & Birch

[57] ABSTRACT

Polyhedral α-alumina particles having a particle size on the order of a micrometer and high purity are prepared by maintaining a compression molded aluminum material having, on its surface, a binary compound of aluminum and oxygen atoms or a ternary compound of aluminum, oxygen and hydrogen atoms in an aluminum melt.

7 Claims, 1 Drawing Sheet

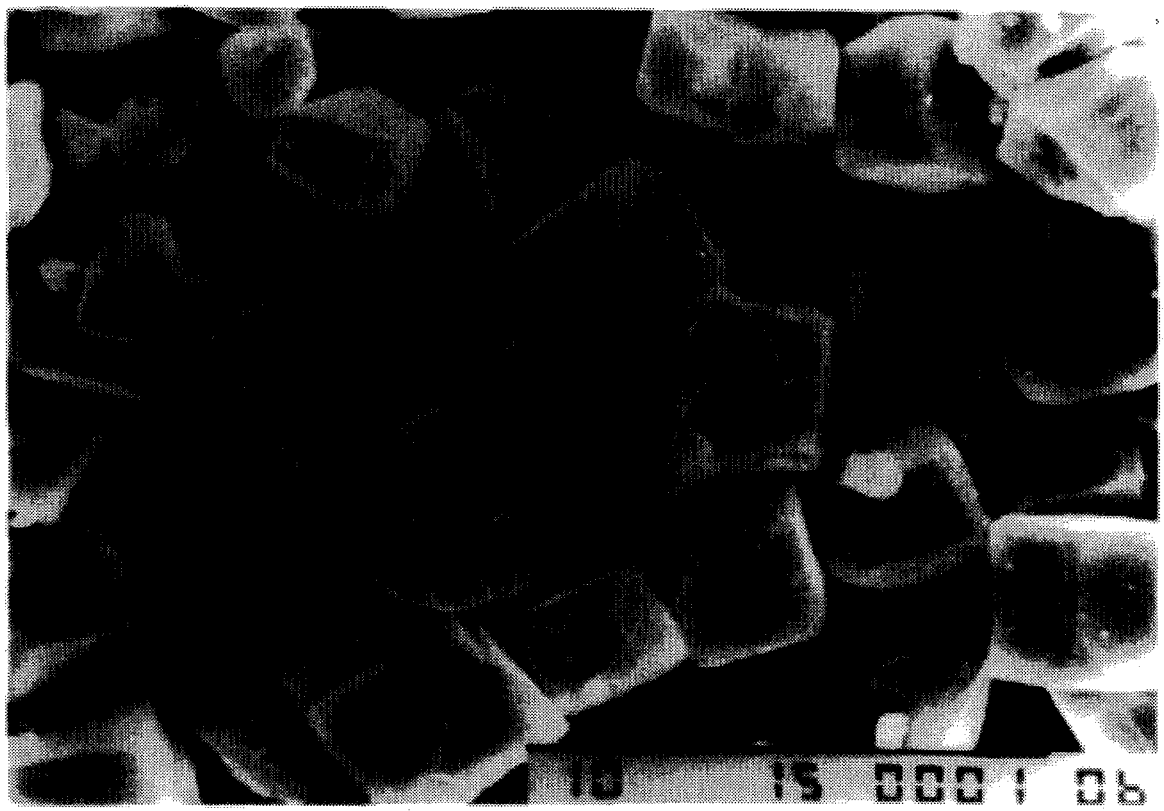
FIGURE

PROCESS FOR PREPARAING POLYHEDRAL α-ALUMINA PARTICLES

BACKGROUND OF THE INVENTION

1. Field of the Invention

The present invention relates to a process for preparing polyhedral α-alumina particles.

2. Description of the Invention

α-Alumina particles are used as abrasives, electrical insulating materials, spray coating materials, sintering powder materials or fillers and, in general, produced by comminuting electrofused alumina ingots which are produced from bauxite or Bayer alumina. However, by using such a method, it is difficult to obtain α-alumina particles having a good quality in view of their crystallinity or purity and they have irregular particle shapes. To overcome such defects, Japanese Patent Publication Nos. 7750/1962, 13465/1964 and 22886/1982 disclose a hydrothermal synthetic method comprising treating alumina having a low crystallinity or a hydrated alumina in hot water at high temperature and high pressure to obtain α-alumina particles having polyhedral shapes which are close to hexagonal plates, hexagonal columns or spheres.

Further, Japanese Patent Kokai Publication No. 54916/1985 discloses a process for preparing thin hexagonal plate form α-alumina particles by mixing and heating aluminum sulfate with an alkali metal carbonate, and Japanese Patent Kokai Publication No. 131517/1991 discloses a flux method for preparing hexagonal platelet α-alumina particles comprising adding a flux which contains aluminum trifluoride and at least one fluoride selected from the group consisting of alkali metal fluorides and alkaline earth metal fluorides to transition alumina, namely a low crystallinity alumina, or hydrated alumina.

Since, the hydrothermal synthetic method treats the raw material in hot water under pressure of 500 kg/cm² or higher, it is restricted by an apparatus to be used. Since the α-alumina particles prepared by the flux method inevitably contain the flux components, it is difficult to prepare the high purity α-alumina particles by the flux method.

SUMMARY OF THE PRESENT INVENTION

One object of the present invention is to provide a process for preparing polyhedral α-alumina particles having high purity without using a high pressure apparatus.

Another object of the present invention is to provide a process for preparing α-alumina at a temperature of 1000° C. or lower in which temperature range alumina is said to be not crystallized to form the α-phase.

According to the present invention, there is provided a process for preparing polyhedral α-alumina particles comprising compression molding an aluminum material having, on its surface, at least one compound selected from the group consisting of a binary compound of aluminum and oxygen atoms and a ternary compound of aluminum, oxygen and hydrogen atoms, maintaining said compression molded aluminum material at a temperature higher than a melting point of aluminum or in an aluminum melt and recovering the polyhedral α-alumina particles from the aluminum melt.

BRIEF DESCRIPTION OF THE DRAWING

The FIGURE is a scanning electron microphotograph of the polyhedral α-alumina particles prepared in Example 7 (magnification: 3800 times).

DETAILED DESCRIPTION OF THE INVENTION

In one embodiment of the present invention, the aluminum material having, on its surface, at least one compound selected from the group consisting of a binary compound of aluminum and oxygen atoms and a ternary compound of aluminum, oxygen and hydrogen atoms is compression molded and the compression molded aluminum material is maintained at a temperature higher than a melting point of aluminum to form an aluminum melt. As the result, the aluminum forms a melt and the binary and/or ternary compounds present on the surface of the aluminum material are mixed and maintained in the formed aluminum melt.

In another embodiment of the present invention, the compression molded aluminum material is maintained in the beforehand formed aluminum melt.

As the aluminum material, a powder, a foil, an ingot, a plate, a rod or an extruded material may be used.

Alternatively, aluminum powder containing therein at least one compound selected from the group consisting of a binary compound of aluminum and oxygen atoms and a ternary compound of aluminum, oxygen and hydrogen atoms is maintained at a temperature higher than the melting point of aluminum, whereby aluminum is molten to form the aluminum melt. As the result, the binary and/or ternary compounds contained in the aluminum powder is mixed and maintained in the aluminum melt.

The above aluminum powder can be obtained by repeatedly applying mechanical force such as impact force, friction force or shear force on surface oxide coating films of the aluminum powder particles to break the coating films and disperse them in the particles.

The aluminum powder containing dispersed therein the binary compound of aluminum and oxygen atoms and/or the ternary compound of aluminum, oxygen and hydrogen atoms. dispersed therein can be prepared by adding the binary and/or ternary compounds to the aluminum powder and repeatedly applying mechanical force such as impact force, friction force or shear force on the mixture.

Examples of the binary compound of the aluminum and oxygen atoms are γ-alumina, δ-alumina, θ-alumina, κ-alumina, χ-alumina, η-alumina, ρ-alumina, α-alumina, etc., and examples of the ternary compound of the aluminum, oxygen and hydrogen atoms are boehmite, gibbsite, bayerite, diaspore, etc. In addition, the binary and/or ternary compounds include a spontaneously generated oxide film, a high temperature oxide film, a boehmite film, a quasi-boehmite film, an anodized film and the like which are formed on a surface of an aluminum material such as an aluminum powder, an aluminum foil, an aluminum ingot, an aluminum plate, an aluminum rod or an aluminum extruded product.

In the present invention, there is no limitation on the purity of aluminum. Usually, the purity of aluminum may be at least 90% by weight. When the higher purity aluminum melt is used, the higher purity α-alumina particles can be obtained.

The "purity" herein used is intended to mean a value calculated by deducting a sum of impurities (e.g. Fe, Si, Cu, Mg, etc.) and the added elements from 100% by weight.

One of the important characteristics of the present invention is that, when the polyhedral α-alumina particles are produced from the binary compound of aluminum and oxygen atoms and/or the ternary compound of aluminum, oxygen and hydrogen atoms, the binary and/or ternary compounds are wetted with the aluminum melt.

When there is used a raw material (e.g., the aluminum powder, the aluminum foil, the aluminum ingot, the aluminum plate, the aluminum rod or the aluminum extruded product) on which the binary compound of aluminum and oxygen atoms and/or the ternary compound of aluminum, oxygen and hydrogen atoms are present, the powder, foil, ingot, plate, rod or extruded product is preferably formed by pressing and the like to achieve good wetting by the aluminum melt and make it possible to prepare the polyhedral α-alumina particles.

A porosity of the compression molded material of as close to zero as possible is advantageous for the preparation of the polyhedral α-alumina particles. When the porosity is 50% or less, the polyhedral b-alumina particles can be prepared. The porosity is preferably 40% or less, more preferably 30% or less.

When the aluminum powder containing the binary and/or ternary compounds therein is used, it is simply maintained at a temperature higher than the melting point of aluminum to wet the binary and/or ternary compounds with the aluminum melt, whereby the polyhedral α-alumina particles can be prepared. Alternatively, such aluminum powder is compression molded in the form of, for example, pellets and the molded material is maintained at the temperature higher than the melting point of aluminum, whereby the polyhedral α-alumina particles can be prepared.

A heating rate of the raw material is not critical and arbitrarily selected. A temperature at which the raw material is maintained is selected so that the aluminum raw material can maintain its liquid phase. For example, under atmospheric pressure, the temperature is from 660° C. which is the melting point of aluminum to 2450° C. which is the boiling temperature of aluminum. However, it is difficult to maintain the liquid phase at the melting point, while at the high temperature, a considerable amount of aluminum is lost due to evaporation. Then, a preferred temperature range of the aluminum melt is from 680° C. to 1500° C. In view of the economy of the preparation, it is possible to obtain high purity polyhedral α-alumina particles at a temperature of 1000° C. or lower at which no α-crystallization of aluminum occurs in the conventional methods.

In general, the aluminum melt is maintained under atmospheric pressure, while it is possible to increase or decrease the pressure in a range in which the aluminum maintains its liquid phase.

There is no specific limitation on a maintaining time. The maintaining time is at least 5 minutes which is a possible processing time industrially. In practice, about 60 minutes are sufficient.

The formed polyhedral α-alumina particles may be recovered from the aluminum melt by any of conventional methods such as filtration from the aluminum melt, centrifugal separation from the aluminum melt, chemical or electrochemical dissolution of solidified aluminum, or combinations thereof.

PREFERRED EMBODIMENTS OF THE INVENTION

The present invention will be illustrated by the following examples, which do not limit the present invention in any way.

EXAMPLE 1

A commercially available aluminum foil (20 g) having a spontaneously generated oxide film thereon, a purity of 99.5% and a thickness of 15 μm was boiled in ion-exchanged water to form a boehmite film on its surface.

The aluminum foil was molded in a cylinder form of 24 mm in diameter and 17 mm in height at 450° C. under reduced pressure of 0.08 Torr using a uniaxial pressing machine (a hot press manufactured by Gakei Electric Corporation) at a pressing pressure of 2000 kg/cm$^2$. One end face of the molded body was polished and observed by a metal microscope. No pore was found.

The molded material was charged in a crucible made of graphite and maintained in a furnace at 800° C. for 60 minutes in an argon atmosphere. After cooling it outside the furnace, aluminum was dissolved with hydrochloric acid and removed from a resulting ingot to obtain a powder (200 mg). The powder was observed by an X-ray diffraction measurement (RAD-γC manufactured by Rigaku Denki Co., Ltd.) and a scanning electron microscope (JSM-T220 manufactured by Japan Electron Datum Co., Ltd.) to find that most of the powder particles were polyhedral particles of α-alumina and their typical particle size was 3 μm.

The raw material compounds and production conditions are summarized in Tables 1 and 2, respectively.

EXAMPLE 2

In the same manner as in Example 1 except that, without boiling in ion-exchanged water, the same aluminum foil (20 g) as used in Example 1 was uniaxially pressed and maintained at 800° C. for 60 minutes, the alumina powder was obtained. According to the results of the X-ray diffraction measurement and the scanning electron microscope observation, most of the powder particles were polyhedral particles of α-alumina and their typical particle size was 3 μm.

The raw material compounds and production conditions are summarized in Tables 1 and 2, respectively.

EXAMPLE 3

In the same manner as in Example 1 except that, without boiling in the ion-exchanged water, aluminum powder (20 g) having a spontaneously generated oxide film thereon, a purity of 99.99% and a particle size of 150 to 300 μm was uniaxially pressed and maintained at 800° C. for 60 minutes, the powder was obtained. According to the results of the X-ray diffraction measurement and the scanning electron microscope observation, most of the powder particles were polyhedral particles of α-alumina and their typical particle size was 3 μm.

The raw material compounds and production conditions are summarized in Tables 1 and 2, respectively.

EXAMPLE 4

In the same manner as in Example 1 except that, without boiling in ion-exchanged water, the same aluminum foil (20 g) as used in Example 1 was uniaxially pressed and maintained at 800° C. for 60 minutes in a crucible made of alumina in an air, the alumina powder was obtained. According to the results of the X-ray diffraction measurement and the scanning electron microscope observation, most of the powder particles were polyhedral particles of α-alumina and their typical particle size was 2 μm.

The raw material compounds and production conditions are summarized in Tables 1 and 2, respectively.

EXAMPLE 5

The same aluminum foil (20 g) as used in Example 1 was boiled in ion-exchanged water to form a boehmite film on its surface. The aluminum foil was uniaxially pressed in the same manner as in Example 1, added in an aluminum melt (20 g) having a purity of 99.5% which had been molten in a crucible made of graphite at 800° C. in an argon atmosphere and maintained at 800° C. for 60 minutes.

Thereafter, the powder was prepared in the same manner as in Example 1. According to the results of the X-ray diffraction measurement and the scanning electron microscope observation, most of the powder particles were polyhedral particles of α-alumina and their typical particle size was 3 μm.

The raw material compounds and production conditions are summarized in Tables 1 and 2, respectively.

EXAMPLE 6

The same aluminum foil (20 g) as used in Example 1 was boiled in ion-exchanged water to form a boehmite film on its surface. The aluminum foil was uniaxially pressed under reduced pressure of 0.08 Torr at 450° C. with gradually increasing pressing pressure to form a cylinder having a diameter of 24 mm and a height of 22 mm. One end face of the molded body was polished and observed by a metal microscope. Many pores were found.

From the comparison of the height of 22 mm with the height of 17 mm of the cylinder having no pore (Example 1), a porosity of this porous cylinder was estimated at about 23%.

The cylinder was maintained at 800° C. for 60 minutes in the same way as in Example 1.

Thereafter, the powder was prepared in the same manner as in Example 1. According to the results of the X-ray diffraction measurement and the scanning electron microscope observation, the formation of polyhedral particles of α-alumina was confirmed, and their typical particle size was 5 μm.

The raw material compounds and production conditions are summarized in Tables 1 and 2, respectively.

EXAMPLE 7

Spherical pure aluminum particles (25 g) having a purity of 99.99% and particle sizes of from 300 to 425 μm were treated by the mechanical shock method (the method for applying mechanical force such as impact, friction or shearing on a surface of a particle by high speed air flow) in an air of a high air flow rate at a rotor peripheral speed of 60 m/sec. for 3 minutes using a Hybridizer (NHS-O Special Type manufactured by Nara Machine Manufacturing Co., Ltd.).

After treatment, the aluminum powder (1 g) was embedded in an acrylic resin and mechanically polished, and cross sections of the powder particles were observed with the scanning electron microscope (JSM-T220 manufactured by Japan Electron Datum Co., Ltd.) to find many particles of oxidized films having a particle size of less than 0.1 μm which were parted and dispersed in the aluminum powder particles.

The aluminum particles (20 g) was charged in the graphite crucible and maintained at 800° C. for 60 minutes in the argon atmosphere. After cooling them outside the furnace, aluminum was dissolved with hydrochloric acid and removed from the particles to obtain a powder (220 mg). The powder was observed by an X-ray diffraction measurement (RAD-γC manufactured by Rigaku Denki Co., Ltd.) and a scanning electron microscope (JSM-T220 manufactured by Japan Electron Datum Co., Ltd.) to find that most of the powder particles were polyhedral particles of α-alumina and their typical particle size was 3 μm.

The raw material compounds and production conditions are summarized in Tables 1 and 2, respectively.

The scanning electron microphotograph of the polyhedral α-alumina is shown in the accompanying FIGURE.

EXAMPLE 8

To the same pure aluminum powder (20 g) as used in Example 7, boehmite powder having a central particle size of 2 μm (1.25 g) was added. Then, the mixture was treated by the same impact method as employed in Example 7. The aluminum powder was charged in the graphite crucible and maintained at 800° C. for 60 minutes.

Thereafter, by the same manner as in Example 7, the powder (510 mg) was obtained. According to the results of the X-ray diffraction measurement and the scanning electron microscope observation, most of the particles were polyhedral particles of α-alumina and their typical particle size was 1 μm.

The raw material compounds and production conditions are summarized in Tables 1 and 2, respectively.

Amounts of the impurities in the raw material boehmite powder and those in the polyhedral α-alumina were measured by the high frequency inductively coupled plasma atomic emission spectrometry (using SPS 120 VR manufactured by Seiko Electronic Industries Co., Ltd.). The results are shown in Table 3. The amounts of impurities in the produced polyhedral α-alumina particles were far lower than those in the raw material boehmite powder.

EXAMPLE 9

In the same manner as in Example 8 except that γ-alumina powder having a mean particle size of 2 μm was used in place of the boehmite powder, the powder (450 mg) was prepared.

According to the results of the X-ray diffraction measurement and the scanning electron microscope observation, most of the particles were polyhedral particles of α-alumina and their typical particle size was 4 μm.

The raw material compounds and production conditions are summarized in Tables 1 and 2, respectively.

EXAMPLE 10

In the same manner as in Example 8 except that α-alumina powder having a mean particle size of 0.2 μm was used in place of the boehmite powder and the mixture was maintained at 1000° C. for 10 hours instead of at 800° C. for 1 hour, the powder (1100 mg) was prepared.

According to the results of the X-ray diffraction measurement and the scanning electron microscope observation, most of the particles were polyhedral particles of α-alumina and their typical particle size was 10 μm.

The raw material compounds and production conditions are summarized in Tables 1 and 2, respectively.

COMPARATIVE EXAMPLE 1

The same aluminum foil (20 g) as used in Example 1 was boiled in the ion-exchanged water to form the boehmite film on its surface, and the aluminum foil was uniaxially pressed in the same manner as in Example 1 and maintained at a temperature of 650° C. which was lower than the melting point of aluminum for 60 minutes. Thereafter, in the same manner as in Example 1, the powder was obtained.

According to the results of the X-ray diffraction measurement and the scanning electron microscope observation, no α-alumina phase was identified or no polyhedral particle was found.

The raw material compounds and production conditions are summarized in Tables 1 and 2, respectively.

COMPARATIVE EXAMPLE 2

The same aluminum foil (20 g) as used in Example 1 was boiled in the ion-exchanged water to form the boehmite film on its surface. Without uniaxial press, the aluminum foil was charged in the graphite crucible and maintained at 800° C. for 60 minutes in the argon atmosphere.

After cooling it outside the furnace, aluminum was dissolved with hydrochloric acid and removed from a resulting ingot to obtain a powder.

From the results of the X-ray diffraction measurement and the scanning electron microscope observation, no α-alumina phase was observed or no polyhedral particle was found.

The raw material compounds and production conditions are summarized in Tables 1 and 2, respectively.

COMPARATIVE EXAMPLE 3

The same pure aluminum powder (20 g) as used in Example 7 was charged in the graphite crucible and maintained at 800° C. for 60 minutes in the argon atmosphere. After cooling it outside the furnace, aluminum was dissolved with hydrochloric acid and removed from a resulting ingot, but no polyhedral α-alumina particle was obtained.

The raw material compounds and production conditions are summarized in Tables 1 and 2, respectively.

COMPARATIVE EXAMPLE 4 and 5

Each of the same boehmite powder and γ-alumina powder as used in Examples 8 and 9 (each 20 g) was charged in the graphite crucible and maintained at 800° C. for 60 minutes in the argon atmosphere. From the results of the X-ray diffraction measurement and the scanning electron microscope observation on the powder obtained after cooling it outside the furnace, no α-alumina phase was observed or no polyhedral particle was found in both cases.

The raw material compounds and production conditions are summarized in Tables 1 and 2, respectively.

COMPARATIVE EXAMPLE 6

The same α-alumina powder (20 g) as used in Example 10 was charged in the graphite crucible and maintained at 1000° C. for 10 hours in the argon atmosphere. From the results of the X-ray diffraction measurement and the scanning electron microscope observation on the powder obtained after cooling outside the furnace, the α-alumina phase was observed but the particle shape of the raw material α-alumina was not substantially changed and no polyhedral particle was found.

The raw material compounds and production conditions are summarized in Tables 1 and 2, respectively.

TABLE 1

| Example No. | Raw material(s) |
| --- | --- |
| 1 | Boehmite film on the aluminum foil surface |
| 2 | Oxide film spontaneously generated on the aluminum foil |
| 3 | Oxide film spontaneously generated on the aluminum powder particle surfaces |
| 4 | Oxide film spontaneously generated on the aluminum foil |
| 5 | Boehmite film on the aluminum foil surface |
| 6 | Boehmite film on the aluminum foil surface |
| 7 | Oxide film in the aluminum powder |
| 8 | Oxide film and boehmite powder both in the aluminum powder |
| 9 | Oxide film and γ-alumina powder both in the aluminum powder |
| 10 | Oxide film and α-alumina powder both in the aluminum powder |
| Comp. 1 | Boehmite film on the aluminum foil surface |
| Comp. 2 | Boehmite film on the aluminum foil surface |
| Comp. 3 | Oxide film on the aluminum powder particle surface |
| Comp. 4 | Boehmite powder |
| Comp. 5 | γ-Alumina powder |
| Comp. 6 | α-Alumina powder |

TABLE 2

| Example No. | Press molding | Porosity (%) | Al melt | Maintaining temp. (°C.) | Maintaining time (min.) | Atmospheric gas |
| --- | --- | --- | --- | --- | --- | --- |
| 1 | Yes | 0 | Yes | 800 | 60 | Argon |
| 2 | Yes | 0 | Yes | 800 | 60 | Argon |
| 3 | Yes | 0 | Yes | 800 | 60 | Argon |
| 4 | Yes | 0 | Yes | 800 | 60 | Air |
| 5 | Yes | 0 | Yes | 800 | 60 | Argon |
| 6 | Yes | 23 | Yes | 800 | 60 | Argon |
| 7 | No | — | Yes | 800 | 60 | Argon |
| 8 | No | — | Yes | 800 | 60 | Argon |
| 9 | No | — | Yes | 800 | 60 | Argon |
| 10 | No | — | Yes | 1000 | 600 | Argon |
| Com. 1 | Yes | 0 | No | 650 | 60 | Argon |
| Com. 2 | No | — | Yes | 800 | 60 | Argon |
| Com. 3 | No | — | Yes | 800 | 60 | Argon |
| Com. 4 | No | — | No | 800 | 60 | Argon |
| Com. 5 | No | — | No | 800 | 60 | Argon |
| Com. 6 | No | — | No | 1000 | 600 | Argon |

TABLE 3

| Impurity element | Amount in raw material boehmite (ppm) | Amount in the produced α-alumina particles (ppm) |
| --- | --- | --- |
| Fe | 60 | 17 |
| Na | 72 | 7 |
| Si | 66 | 27 |
| Ca | 71 | 21 |
| Ti | 22 | 4 |
| Cu | <1 | <1 |

What is claimed is:

1. A process for preparing polyhedral α-alumina particles, comprising the steps of:

compression molding an aluminum material having, on its surface, at least one compound selected from the group consisting of a binary compound of aluminum and oxygen atoms and a ternary compound of aluminum, oxygen and hydrogen atoms to obtain a compression molded aluminum material;

subjecting said compression molded aluminum material to a temperature of from 680° to 1000° C. to form an aluminum melt; and recovering polyhedral α-alumina particles from said aluminum melt.

2. The process according to claim 1, wherein said aluminum material is at least one material selected from the group consisting of an aluminum powder, an aluminum foil, an aluminum ingot, an aluminum plate, and an aluminum rod.

3. The process according to claim 1, wherein said compression molded aluminum material has a porosity of 50% or less.

4. The process according to claim 1, wherein said compound on the surface of aluminum material is a ternary compound of aluminum, oxygen and hydrogen.

5. The process according to claim 1, wherein the polyhedral α-alumina particles are recovered by a recovery method selected from the group consisting of filtration of the aluminum melt, centrifugal separation of the aluminum melt, chemical dissolution of the aluminum melt after the melt solidifies, and combinations thereof.

6. The process according to claim 1, wherein the polyhedral α-alumina particles have a particle size of about 2 to 10 microns.

7. The process according to claim 1, wherein said compression molded aluminum powder is subjected to the temperature of from 680° to 1,000° C. under an argon atmosphere.

* * * * *